(12) United States Patent
Chen

(10) Patent No.: US 8,554,604 B2
(45) Date of Patent: Oct. 8, 2013

(54) METHOD AND APPARATUS FOR MODELING A BUSINESS PROCESSES

(75) Inventor: Kay-Yut Chen, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2151 days.

(21) Appl. No.: 09/944,969

(22) Filed: Aug. 30, 2001

(65) Prior Publication Data

US 2003/0046123 A1 Mar. 6, 2003

(51) Int. Cl.
*G06Q 10/00* (2012.01)

(52) U.S. Cl.
USPC .................................. 705/7.37; 705/7.36

(58) Field of Classification Search
USPC .............................. 705/7.36, 7.37
See application file for complete search history.

(56) References Cited

U.S. PATENT DOCUMENTS

| | | | | |
|---|---|---|---|---|
| 6,138,103 | A * | 10/2000 | Cheng et al. | 705/7 |
| 6,405,173 | B1 * | 6/2002 | Honarvar et al. | 705/7 |
| 6,430,542 | B1 * | 8/2002 | Moran | 705/36 R |
| 6,931,365 | B1 * | 8/2005 | Mehta et al. | 703/1 |
| 7,283,971 | B1 * | 10/2007 | Levine et al. | 705/7.13 |
| 2001/0056544 | A1 * | 12/2001 | Walker | 713/200 |
| 2002/0143692 | A1 * | 10/2002 | Heimermann et al. | 705/37 |
| 2002/0147622 | A1 * | 10/2002 | Drolet et al. | 705/7 |
| 2002/0169657 | A1 * | 11/2002 | Singh et al. | 705/10 |
| 2002/0169658 | A1 * | 11/2002 | Adler | 705/10 |
| 2002/0194043 | A1 * | 12/2002 | Lidow | 705/7 |
| 2002/0194057 | A1 * | 12/2002 | Lidow | 705/10 |
| 2004/0107132 | A1 * | 6/2004 | Honarvar et al. | 705/11 |
| 2005/0027845 | A1 * | 2/2005 | Secor et al. | 709/223 |

OTHER PUBLICATIONS

"A Fuzzy game theoretic approach to Multi-agent coordination" by Wu et al, Lecture Notes in Computer Science, Published by Springer Berlin/Heidelberg, p. 76, 1999.*
"Agents that buy and sell" by Maes et al, Communications of the ACM, Mar. 1999.*
"Agent-mediated integrative negotiation for retail electronic commerce" by Guttman et al, published by Springer-Verlag Heidelberg, AMET-98, LNAI 1571, p. 70-90, 1999.*
"Is it an agent or just a program?: A taxonomy for autonomous agents" by Franklin et al, Proceedings of the Third International Workshop on Agent Theories, Architecture and Languages, Springer-Verlag, 1996.*
"Automated Negotiations: A survey of the State of the Art" by Beam et al, white paper by the University of California, Berkeley, Walter Haas School of Business, 1997.*
"Introduction to game theory and its applications in electric power markets" by Singh, IEEE Computer Applications in Power, Oct. 1999.*
"Rules of Thumb versus Dynamic Programming" by Lettau et al, The American Economic Review, Mar. 1999.*
"On designing economic agents that behave like human agents" by Arthur, Stochastic Hydrology and Hydraulics, Published by Springer Berlin/Heidelberg, Mar. 1993.*

(Continued)

*Primary Examiner* — Thomas L Mansfield, Jr.

(57) ABSTRACT

A method of determining the behavioral outcome resulting from a business rule includes the step of defining at least one player, business rules, and an environment that defines actions that the player can take in accordance with the business rules. The definitions are translated into a codified script. The behavioral outcome resulting from player-selected actions during execution of the codified script are determined.

22 Claims, 5 Drawing Sheets

(56) References Cited

OTHER PUBLICATIONS

"Modeling Managerial Behavior: Misperceptions of Feedback in a Dynamic Decision Making Experiment" by Sterman, Management Science, Mar. 1989.*

"Minimal Intelligence Agents for bargaining behaviors in market-based environments" by Cliff et al, Hewlett Packard Technical Bulletins, Aug. 1997.*

"Less than human: simple trading agents for CDA markets" by Cliff et al, Hewlett Packard Technical Bulletins, 1997.*

"A model for the E-service marketplace" by Durante et al, Hewlett Packard Technical Bulletins, Feb. 2000.*

"Automated Trading in agents-based markets for communication bandwidth" by Vulkan et al, Hewlett Packard Technical Bulletins, Feb. 2000.*

"Shop 'Til you drop II: Collective AdaptAdaptive Behavior of Simple Autonomous Trading Agents in Simulated 'Retail' Markets" by Cliff et al, Hewlett Packard Technical Bulletins, Mar. 1998.*

"Human Agent Communication" by Dickinson, Hewlett Packard Technical Bulletins, Jul. 1998.*

Fischbacker, Urs. z-Tree—Zurich Toolbox for Readymade Economic Experiments—Experimenter's Manual, Institute for Empirical Research in Economics, University of Zurich, Sep. 1999.*

Sugges, Peter R. Jr. The Use of Computerized Business Games to Simulate business Behavior Under Different Policies, IEEE Winter Simulation Conference, 1979, pp. 563-567.*

"Portfolio" web page, downloaded Feb. 8, 2007 from http://www.ugcs.caltech.edu/—bruce/portfolio/index.html, 2 pages.*

Chaturvedi, Alok and White, Richard. "Synthetic Economies: The Application of Distributed Interactive Computing Environments for Policy and Management Decision Making" Institute for Defense Analysis, Sep. 1997.*

Chaturvedi, A. R. and Mehta, S. R. 1999. Simulations in economics and management. Communication of the ACM 42, (Mar. 3, 1999), 60-61.*

Jepsen, Tom. "How Programming Languages Evolve", IT Pro, Nov./Dec. 1999, pp. 68-77.*

Cover page to Singh, "Introduction to Game Theory and its Application in Electric Power Markets", Computer Applications in Power, IEEE, vol. 12, Issue 4, pp. 18-20, 22, Oct. 1999.*

Singh, "Introduction to Game Theory and its Application in Electric Power Markets", Computer Applications in Power, IEEE, vol. 12, Issue 4, pp. 18-20, 22, Oct. 1999.*

Andrew Byde, et al., "AutONA: A System for Automated Multiple 1-1 Negotiation", In the Proc. of IEEE Conference on E-Commerce, pp. 1-8, 2003.

Kay-Yut Chen, et al., "Computer Games and Experimental Economics", In the Proc. of ICEIS, pp. 1-20, Apr. 2003.

Kay-Yut Chen, et al., "Predicting the Future", Information System Frontier, pp. 1-9, Jan. 2003.

Kay-Yut Chen, "Defeating Terrorists with Games", Position paper presented at DARPA GAMBIT Conference, pp. 1-4, Mar. 2002.

Gary Charness, et al., "Minimum Advertised Price Policy Rules and Retailer Behavior: An Experiment", Interfaces, special issue on Experimental Economics, pp. 62-73, Sep.-Oct. 2002.

Kay-Yut Chen, et al., "Forecasting Uncertain Events with Small Groups", In Proc. of the ACM Conference on E-commerce, pp. 1-7, Oct. 2001.

Kay-Yut Chen, et al., "A Quantum Treatment of Public Goods Economics", Quantum Information Processing, vol. 1, Issue 6, pp. 449-469, Dec. 2002.

Mums Software System, Internally used at the Hewlett Packard Company in 1999, described in Exhibits A-E to the Supplemental Declaration Under 37 CFR § 1.131.

* cited by examiner

US 8,554,604 B2

METHOD AND APPARATUS FOR MODELING A BUSINESS PROCESSES

FIELD OF THE INVENTION

This invention relates to the field of business processes. In particular, this invention is drawn to predicting the economic impact of changes in business policies.

BACKGROUND OF THE INVENTION

Businesses must be able to accurately predict or forecast events that affect the economic state of the business. Accurately predicting demand for a product, for example, is necessary in order to match production with demand. Underestimating demand results in lost sales. Overestimation of demand results in unrealized sales and associated carrying costs. Changes in business policies may undesirably impact the actual demand and the certainty of any predictions in demand and thus the financial state of the business.

Types of policy changes that can result in changes to the financial state of the business include but are not limited to sales pricing changes, advertising changes, and return policy changes. Lowering the price of the product directly, providing a rebate to the customer, or providing financial incentives to the seller are examples of sales techniques that may affect sales, returns, and profits. Accurately predicting the effect of policy changes is critical to the financial well-being of the business. Ideally the business would like to accurately predict consumer behavior with respect to its services or products in view of sales, advertising, returns, rebate, warranty, or other policies.

Although the economic effect of policy changes can be tested in the actual marketplace, such testing may result in significant costs to the business in the case of failure. The business may experience significant financial loss, lost sales, and lost market share when the policies are tested is in the actual marketplace. Thus the cost of experimentation may be exorbitant. Moreover, the product life cycle of some products may be so short that experimentation is futile. By the time an optimal policy is identified, the product has been obsolesced.

Instead of testing policies in the marketplace, simulation software may be used to model the business. Various experimental economics simulation software packages have been developed to model specific types of business organizational structures and the economic effects of policies supporting those organizational structures. One disadvantage of such systems is that they have limited ability to simulate types of business processes and models that are not already pre-defined within the software package. For example, an auction based software simulation system cannot simulate the effects of return policies.

Another disadvantage of these systems is their limited adaptive flexibility. If a process or policy rule is changed, substantial programming may be required to effect the appropriate change in software code. Rule substitution, modification, elimination or introduction is generally not possible without significant programming effort. Generally, the experimenter must choose the individual software package that most closely matches the business processes. Significant policy changes may otherwise require a change of experimental economics simulation software packages.

SUMMARY OF THE INVENTION

In view of limitations of known systems and methods, methods and apparatus for determining or predicting the behavioral outcome resulting from implementation of a set of business rules are provided.

A method of determining the behavioral outcome resulting from a business rule includes the step of defining at least one player, business rules, and an environment that defines actions that the player can take in accordance with the business rules. The definitions are translated into a codified script. The behavioral outcome resulting from player-selected actions during execution of the codified script are determined.

In one embodiment, a method of predicting the economic impact of business policies includes the step of defining a plurality of players including an associated set of rules. The associated set of rules defines a possible decision space, a decision-making process tree, an information set, an outcome function, and a payoff function for each player. The player definitions are translated into codified scripts. The codified scripts are executed in an interactive simulation with the players. The result of the outcome and payoff functions at the conclusion of a script or simulation stage determines the economic impact of the business policies defined by the rules.

In one embodiment, an apparatus for determining or predicting the economic impact of business policies includes a business process definition module. The business process definition module is used to define a plurality of players including an associated set of rules defining a possible decision space, a decision-making process tree, an information set, an outcome function, and a payoff function for each player. The apparatus further comprises a script translator module for translating the player definitions into codified scripts, wherein the codified scripts define at least one simulation stage. A simulation module is provided for executing the codified scripts. The result of the outcome and payoff functions at the end of execution of the at least one script stage determines the economic impact of the business policies defined by the rules.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In order to conduct experiments to predict economic behavior in an environment of changing business policies, a test environment specifying the initial economic conditions, preferences, and costs associated with the exchange of goods or services for monetary value is established as well as the economic metrics and characteristics of the simulation participants. The environment includes human subjects who are controlled through the use of monetary or other financial rewards in order to drive their decisions with proper incentives.

Figure 1:
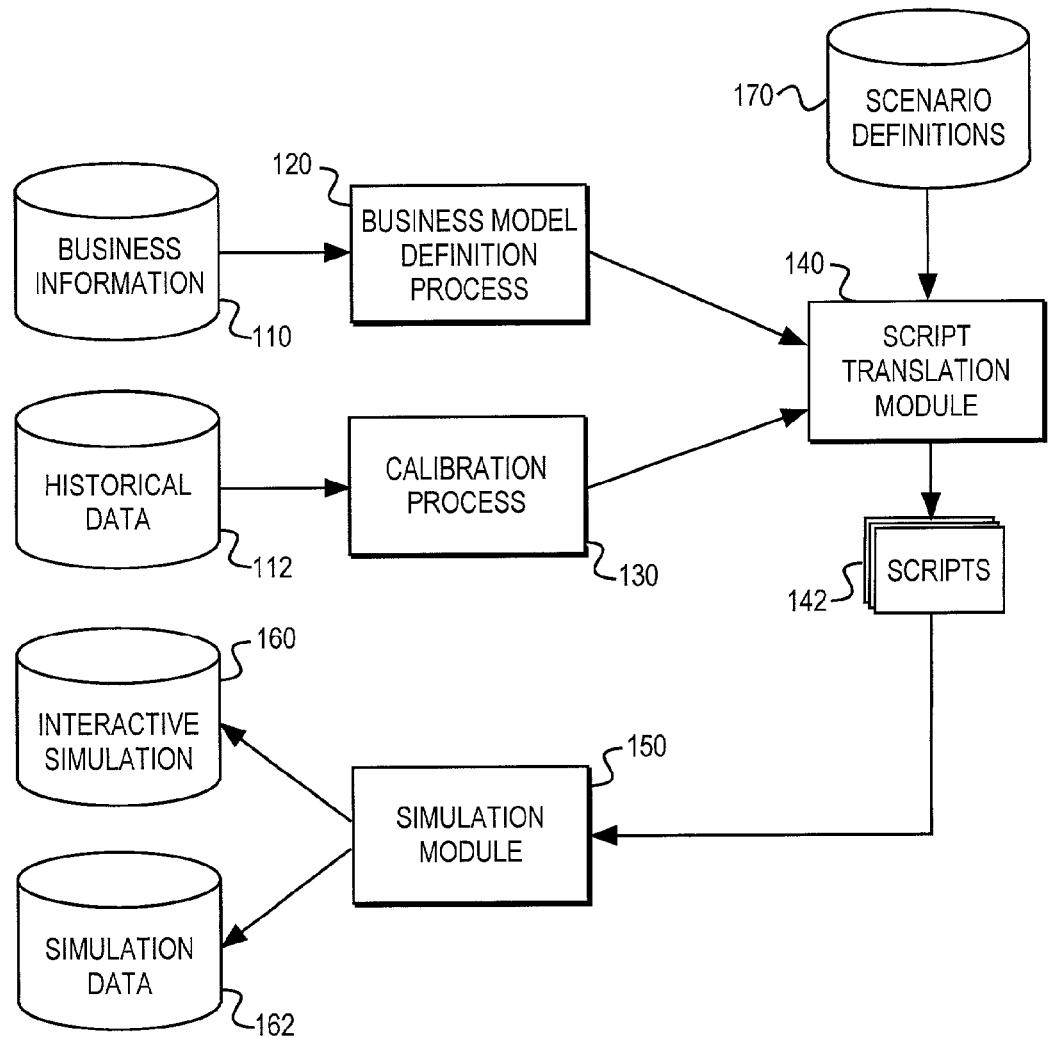
FIG. 1 illustrates a system architecture for predicting the effect of policy changes on business processes.

FIG. 1 illustrates a business process modeling system. Business information database 110 provides business information to the business model definition process 120. The business model definition module determines the institution or language of market communication including bids, offers, and acceptances. The institution defines the rules governing the exchange of information and the rules under which communications become binding contracts.

The business model definition process maps the actual business environment into eight elements: a) decision-making entities (i.e., players), b) game rules, c) possible decision space, d) business variables, e) business process flow (i.e., decision-making process tree), f) information set, g) outcome function, and h) payoff function. The terms "system," "economics system," and "environment" will be used interchangeably to describe a system of interacting decision-makers that operate under a set of game rules. The system includes the players, the game rules, the decision space, decision-making process tree, information set, outcome function, and payoff function.

The decision-making entities represent decision-makers or players in the environment. The function of players is to make decisions (i.e., choose an element in the decision space) in the game. In the experiments, a player or decision-maker can be a human subject or a computer.

One example of a decision-maker is a retailer in a reseller business model. Other types of retailers include national retailers, regional retailers, mass merchant firms, discount shopping clubs, and Internet retailers.

The game rules include the logical processes and decision limitations in the system. For example, a constraint that prevents a player from setting advertising spending greater than the player's budget is a decision limitation. A calculation that defines the player's revenue as a product of the sales price and the unit sales is a logical process.

The possible decision space represents the set of decisions to be made by the decision-making entities. This entity defines the decisions to be made, but not the set of possible decision values. Prices and stocking decisions are examples of decisions to be made in a reseller model. Although each of these decision-makers may have similar decisions to make, the possible decision space may well be different among the decision-makers due to their business model.

Business variables are numerical representations of the state of the economic system including parameters, economic indicators, and accounting variables. Business variables, for example, include inventory, demand, sales, return limits, and total market size. The value of some business variables (e.g., inventory) may be varied directly by the players. Other variable values are established by the environment (e.g., demand, total market size) or indirectly as a result of the actions of one or more players (e.g., sales).

A business process flow or decision-making process tree represents the order and timing of the decisions to be made. The decision-making process tree is defined as a series of nodes connected by a directed graph. Again, the decision-making process tree may be different between different types of retailers.

The information set defines the information that the decision-making entities have access to at each node of the decision-making process tree. Some information for example may only be available after certain decisions have to be made. Some business models (e.g., an Internet retailer) may have near instantaneous access to sales information that permits just in time inventory management while other types (e.g., discount shopping clubs) must purchase in bulk in anticipation of sales.

The outcome function determines the outcome for each decision-making entity as a function of the decision variables. Sales or return volumes, for example, are determined as a function of the decision variables. The payoff function is a scoring or cost function used to evaluate the outcome for each decision-making entity. The payoff function is defined with respect to the decision-making entities. Different decision-making entities may have different goals that drive their respective decision-making processes. For example, an online reseller might place a higher priority on minimizing returns while the manufacturer is attempting to maximize profit, return on investment, sheer sales volume, or revenue growth.

Historical data from database 112 is provided to calibration process 130. Examples of historical data includes price, unit sales, product features, advertising data, return rates, inventory levels, and information about business policies. The historical data can be any data that would permit the calibration engine to make reasonable inferences about the payoff and output functions in view of the business organizational structure.

The calibration process 130 receives historical information about the same or comparable products or services. The information is organized to enable differentiation of the empirical data based on the business organizational structure. The calibration process is used to determine the values of some business variables used in the simulation to ensure the qualitative accuracy of the payoff and output functions.

The script translation process 140 receives the output of the business model definition process 120, the calibration process 130, and scenario definition data from database 170. The script translation process translates the output of the model definition process 120 and the calibration process 130 into a codified business model script 142. This script is a working model.

Variations of the codified business model script are generated based on pre-defined scenarios from the scenario definition database 170. The scenario definitions provide boundary conditions for the simulation as a whole (e.g., total market) as well as for the individual players (e.g., available budgets for inventory, purchase, etc.)

The variations may change the boundary conditions and game rules. For example, variations may implement different minimum advertised price policies (game rules). Similarly, variations may implement different boundary conditions such as purchasing budgets, advertising effectiveness, and market sizes (boundary conditions). If necessary, the experimenter can edit the scripts 142 to adjust boundary conditions or other parameters as desired. Scripts 142 thus include the codified business model and variations.

The scripts 142 codify the players and the substance and form of communicating data between the players and the simulator during simulation. The scripts define and enforce the rules under which the players must abide. Of course, depending upon their individual economic characteristics or business organizational model, the players may be operating under different rules. For example, the scripts may display economic charts and other economic information to a specific participant. The scripts permit flexibility in timing rules such as when information is communicated between, to, and from the players. The scripts may act on data communicated from any player in real time. Alternatively, the scripts may condition the simulator to wait until data from all players is received before continuing.

Figure 2:
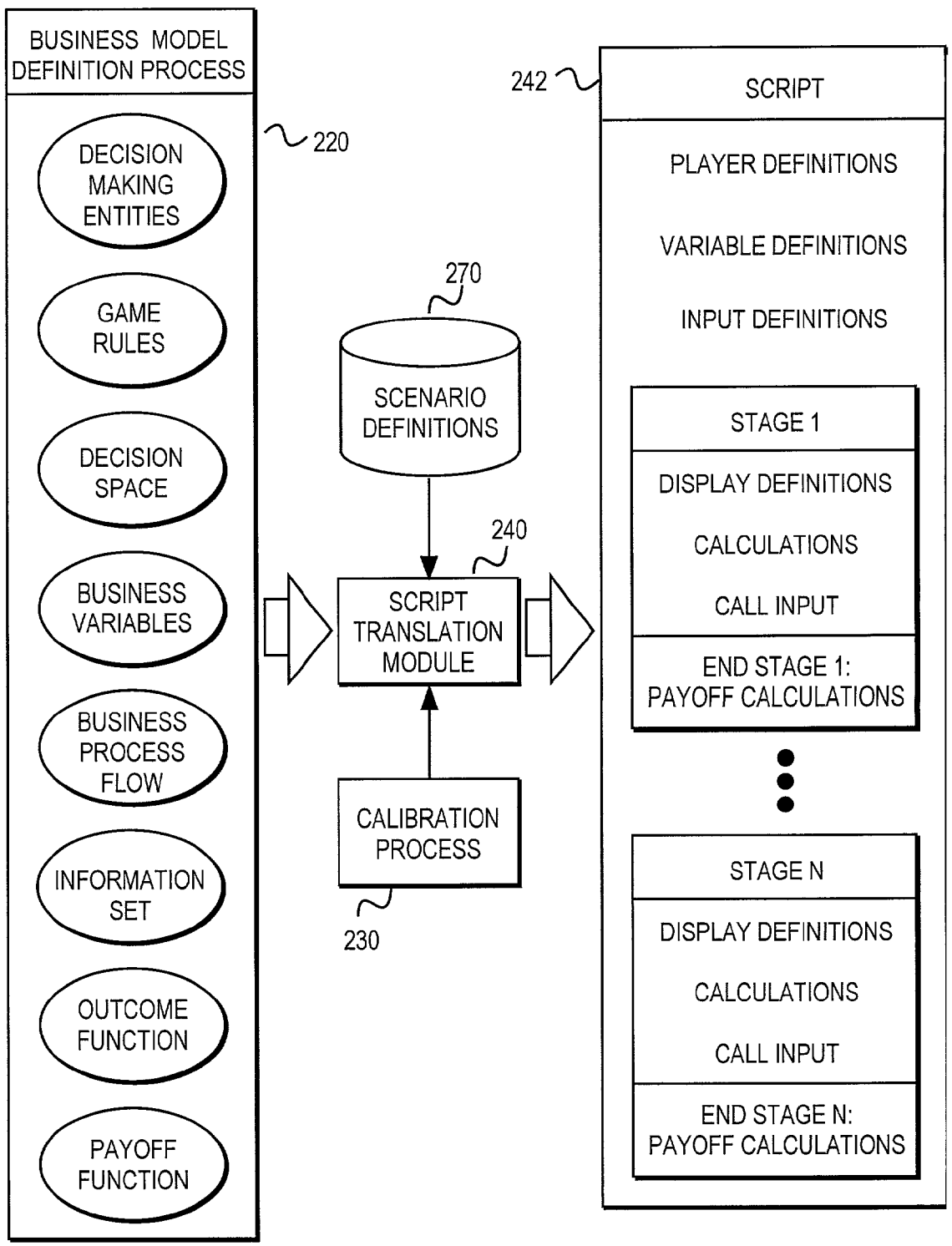
FIG. 2 illustrates interaction between the business model definition process and the script translation module in greater detail.

FIG. 2 illustrates the interaction between the business model definition process 220 with the script translation module 240 in greater detail. The components defined in the business model definition process 220 are made available to the script translation module for the purpose of generating executable scripts such as script 242. Script translation module 240 also receives information from the calibration process 230 and the scenario definitions database 270 as previously described. The resulting script or scripts 242 include the various player, variable, and input definitions that apply globally during the simulation. Each script includes one or more stages of game play. Payoff calculations are performed at the end of each stage.

Referring to FIG. 1, the scripts 142 are provided to simulation module 150 for script execution. The scripts are procedural in form and define one or more stages of simulation. In one embodiment, the simulation module 150 compiles the scripts on the fly (i.e., interpretive execution). Alternatively, the scripts are compiled into a data structure that an internal script engine of the simulation module can then execute. In the latter case, either the script translation module or the simulation module performs the step of compiling the script for execution by the simulation module.

At the end of an executed simulation stage, a payoff is made to the players based on their economic performance. The scripts mediate the simulation including how much money the players can earn. In one embodiment, the scripts are designed such that players define the entire retail market and play exclusively against each other. Global rules that do not change across scenarios are part of the environment and may be defined by the business model definition process as a function of the game rules. Examples of global rules that would be incorporated into the environment and that do not change across scenarios might include consumer buying behavior, manufacturer supply chain processes (e.g., ordering, delivery lead time), etc.

The actual economic simulation can be conducted using humans, automated processes (i.e., "robots"), or some combination of the two. The simulation may be conducted as a game with monetary rewards as an incentive to the players whose actions are constrained by the rules.

The simulations rely on interactive decision-making entities as identified by the scripts. For example, the decision-making entities may be human. The simulation module 150 queries the human players who make the actual decisions when prompted or when permitted. Alternatively, an interactive simulation database 160 is used to generate the decisions when prompted by the simulation module 150. Separate scripts may also be used with the simulation engine to create automated decision-making entities (i.e., computer automated players).

For human interaction, the scripts are designed to provide information to the players based upon their defined econometric metrics and type of business. Thus some economic information may be provided to some players at different times or even entirely omitted. Moreover, the scripts can be configured to provide some players with competitive information about other players in order to examine the effect of business intelligence information on the economic outcome. The scripts also control an input window of time when individual players can make decisions. Depending upon whether real time decision-making is desired, the scripts may be configured to change the data communication and collection intervals between the simulation module and the players.

The simulation module generates simulation data 162 resulting from execution of the codified model and variations. The simulation data includes the variables updated during simulation such as the decision variables, calculated output and payoff results, etc. This simulation data reflects the behavioral outcome of the environment.

The behavioral outcome includes decisions made by the players and variable values determined directly or indirectly from the results of the decisions. For example, prices will be decisions made by players during the simulation (i.e., determined directly). Revenue can be calculated (i.e., determined indirectly) from sales price and unit sales data or determined directly if defined in the game rules and recorded in the simulation data. Thus the behavioral outcome of interest can be determined directly or indirectly from the simulation data.

The use of simulation for the codified business model and variations permits consideration of interdependent decision-makers in the process. In effect, the simulator allows consideration of events occurring at lower levels or finer granularity aspects of the business model that may in fact have significant effect on the outcome.

Although several economic simulators exist for performing simulations in a pre-determined environment and in accordance with a pre-defined institution, these systems are simply not flexible enough to support analyses under changing rules of exchange. Analysis of English, Dutch, first and second price sealed bid auctions, or uniform and discriminative price multiple unit auctions, or manufacturers stated retail price (i.e., posted pricing) with double auction trading, requires different simulators. Although the simulators might permit varying parameters to change thresholds for various actions or behaviors, the rules governing the actions or behaviors are pre-defined such that changing policy rules (not just amounts or thresholds under the same rule) requires another economic simulator specifically created to handle the new rules.

In contrast, rule changes in the architecture of FIG. 1 require only modification to the business process definitions from which the script translation module may generate new scripts incorporating any new policies, policy modifications, or omitting any obsolesced policies. Significant recoding is avoided because script generation and compilation is automated. The experimenter need only directly modify the rules and not the codification of the rules in order to test the economic impact of various business policies.

Examples of business policies that may be tested with the simulator include return policies, price-protection policies, and benefits or penalties contingent upon the compliance of the decision-making entities with policies such as minimum advertised price (MAP) policies. Typically, the manufacturer provides market development funds to advertise the manufacturer's products when the retailer complies with a MAP policy. If the retailer does not comply, the manufacturer may withhold or reduce the market development funds or decrease the amount of products shipped to the retailer.

One purpose behind a MAP policy is to protect market share. If retailers perceive that price competition for the manufacturer's products is too intense, the manufacturer will lose market share because the retailers will attempt to promote products for which price competition is not as intense. Without simulation, however, the manufacturer may not be able to effectively predict the effect of the MAP on market share and retailer profitability. Thus simulation may be used to predict the effect of eliminating or modifying MAP policies on the manufacturer's market share or the retailer's profitability.

Simulation is also advantageous for testing policies on products with short life cycles. Many consumer electronic products such as computers, computer peripherals (e.g., storage devices such as disk drives and tape drives, printers), digital cameras, etc., have such short life cycles that collection of empirical data for the purpose of making policy changes for future sales is futile. The product life cycle has already expired by the time data is collected and analyzed to create or modify business policies.

The business process modeling simulator may be analogized to a wind tunnel. A wind tunnel is used to test aerodynamic properties of scaled physical objects under specific atmospheric conditions. The atmospheric conditions may easily be controlled by the wind tunnel. Scaled versions of the physical object permit rapid modification for further testing. For example, the experimenter may lengthen or shorten wings, change attack angles, change shape, or otherwise change the model to test the performance under various atmospheric conditions. The alternative is to build a full-size version of the physical object. Without a wind tunnel, a geographic location experiencing the conditions that the object is to be tested under must be found so that the object can be moved to that geographic location for testing.

Obviously, the use of a wind tunnel allows controlled atmospheric conditions for testing at the whim of the experimenter and the use of a scaled model permits rapid prototyping and reduces the time and expense otherwise associated with building and testing full-size versions of the physical object without the use of a wind tunnel. The wind tunnel also avoids the risk (e.g., loss of life) that might otherwise be anticipated if testing with the full-size version is required.

Analogous to a wind tunnel and scaled physical models, the business process modeler similarly permits testing the economic impact of business policies or to discriminate between the economic effects of different policies without the risk, effort, or time otherwise required to test the policy in the actual marketplace (e.g., time, financial loss, loss of market share, other economic harm).

Figure 3:
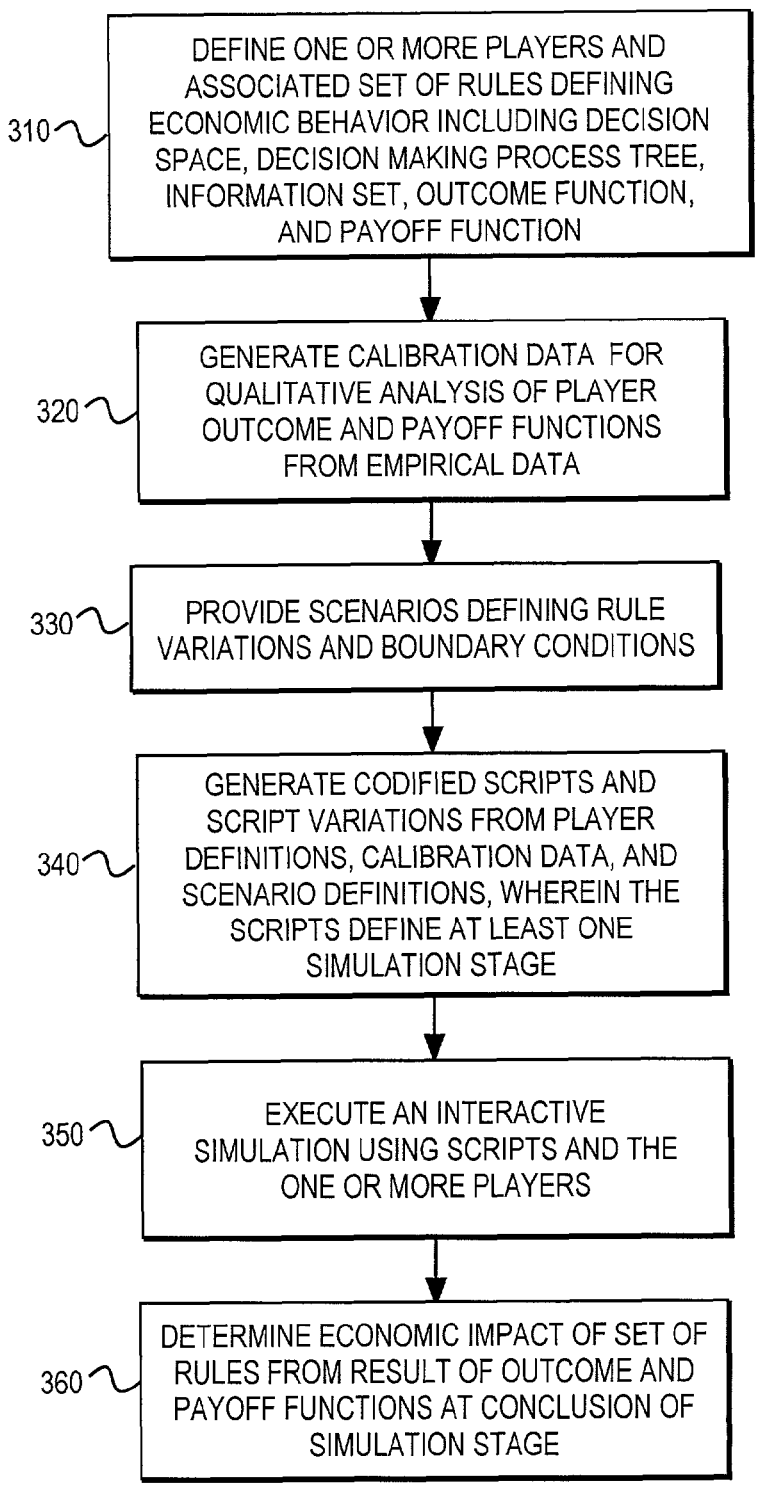
FIG. 3 illustrates a method of modeling business processes and identifying the economic impact of changes to policies through simulation.

FIG. 3 illustrates a method of determining the economic impact of codifiable business policies through simulation. In step 310, one or more players and an associated set of rules are defined. The rules define player economic behavior including decision space, decision-making process tree, information set, outcome function, and payoff function. In step 320, calibration data for qualifying the outcome and payoff functions is provided from empirical data. In step 330, scenarios defining rule variations and boundary conditions are provided.

In step 340, codified scripts and script variations are generated from the player definitions, calibration data, and scenario definitions. The generated scripts define one or more simulation stages. The scripts are converted or compiled into data structures suitable for execution by a simulation module.

In step 350, an interactive simulation is executed using the scripts and the one or more players. The interaction between the players and information communicated between the players and the simulator are governed by the simulator. In step 360, the economic impact of the set of rules (i.e., defined business policies) is determined from the results of the outcome and payoff functions at the conclusion of the simulation stage. The players may be financially rewarded for example by currency based on their performance as determined by the payoff and outcome functions.

Figure 4:
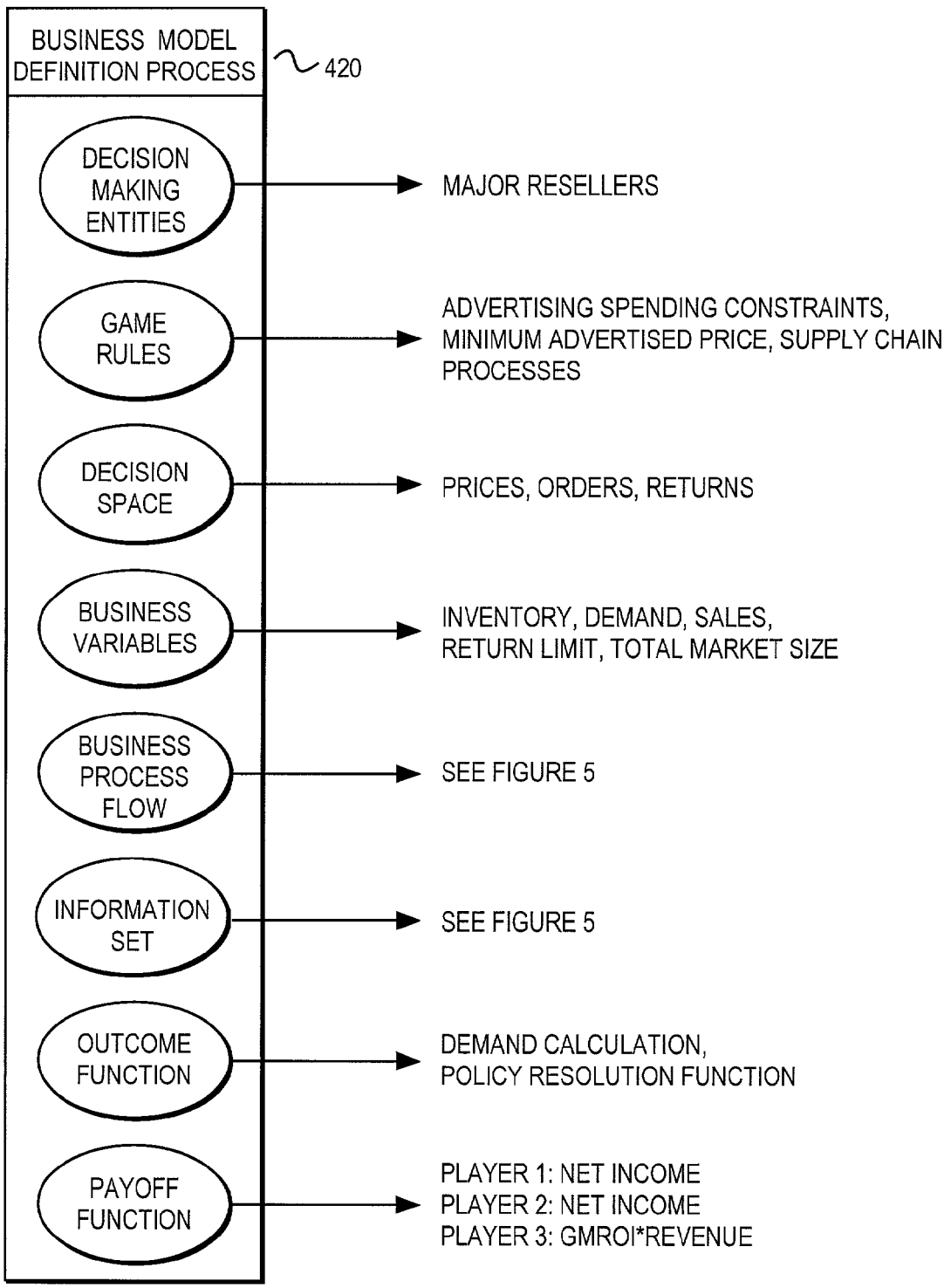
FIG. 4 illustrates application of a method of modeling business processes to evaluate return policies for a various type of resellers.

FIG. 4 illustrates application of the method of FIG. 3 to evaluation of a return policy in a reseller business model. Various A elements of the business model definition process 420 are defined in the context of a market of resellers. The decision-making entities are defined as some combination of resellers. For example, resellers might be chosen from a variety of reseller types including club, internet, national, regional, and mass merchant resellers. In this example, 3 resellers (players) are selected. Examples of game rules include limitations on reseller advertising spending, minimum advertised price, etc. Game rules might also include supply chain processes such as lead time delays, supply chain network, etc.

In a reseller context, the decision space for the individual resellers includes prices, orders, and returns. Business variables include inventory, demand, sales, return limits, and total market size. The outcome function involves calculation of the reseller profit and definition of a policy resolution function. If there is a restocking fee, for example, the outcome will include the costs due to restocking fees. The payoff function is defined based on the metric goals of the resellers. Thus some players may have a payoff based on net income while others have more sophisticated metrics such as revenue times the ratio of gross profit to total inventory value.

Figure 5:
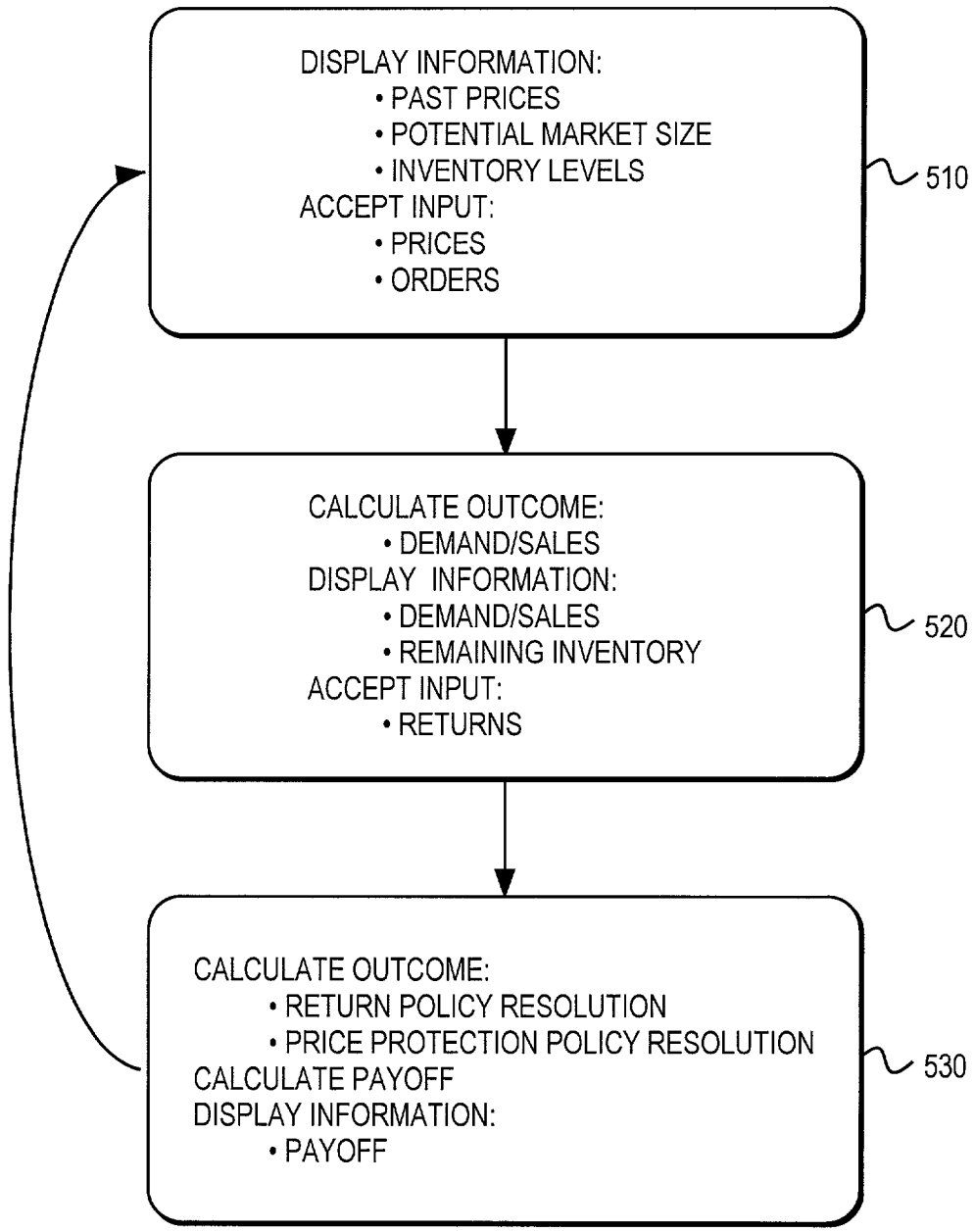
FIG. 5 illustrates a business flow diagram including an information set for the application of FIG. 4.

The business process flow and information set for the reseller context are illustrated in FIG. 5 and generally illustrate data flow between the players and the system during simulation. As indicated in step 510, the players are presented with information on past prices, potential market size, and inventory levels. The players are permitted to set prices and to order more inventory.

In step 520, the system calculates demand and sales volume for the individual resellers resulting from the orders fulfilled on the player-selected prices. This information is presented to the player along with an indication of the remaining inventory. The player is permitted to set the number of returns to be accepted.

In step 530, the outcome is calculated in view of the player's actions and the return and price protection policies in effect. Calculating the outcome requires calculating the resulting effects of the policies such as inventory adjustment, restocking fee charges, depletion of a return credit (some return policies may entitle a retailer only to return credits previously earned by purchases), etc. The payoff can then be calculated and displayed. Steps 510-530 may then be repeated to determine economic performance over several time periods.

Although examples were presented in the context of simulating the economic impact of a manufacturer's advertised price policy, the process may be applied to simulate the economic impact or the behavioral outcome resulting from a variety of other business policies including contractual clauses. For example, the process may be applied for business modeling, contract design, modeling markets and rules of markets, auctions, stock market, and internal organizations of a company.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of determining an economic impact of business policies, comprising:
   a) providing player definitions defining a plurality of players and an associated set of rules defining a decision space, a decision-making process tree, an information set, an outcome function, and a payoff function for each player;
   b) translating, in a computer system, the player definitions into at least one codified script; and
   c) executing, in the computer system, the at least one codified script, wherein a result of the outcome and payoff functions at the end of execution of a script stage determines the economic impact of the business policies defined by the rules.

2. The method of claim 1 wherein the players are exclusively human.

3. The method of claim 1 wherein the players comprise a combination of human and automated players.

4. The method of claim 1 further comprising:
d) modifying the associated set of rules for one or more players; and
e) repeating steps b)-c) according to the modified set of rules.

5. The method of claim 1 further comprising:
d) providing calibration data for the defined players based on empirical sales information, wherein the at least one script is generated in accordance with the player definitions and the calibration data.

6. The method of claim 1 further comprising:
d) providing a plurality of scenarios defining variations on the set of rules associated with one or more players, wherein step c) further comprises generating scripts corresponding to the player definition variations.

7. The method of claim 1 wherein the at least one script is compiled on the fly during execution.

8. The method of claim 1 wherein the at least one script is compiled in its entirety before execution.

9. The method of claim 1 wherein the set of rules associated with at least one player defines at least one business policy from the group comprising: advertising policy, sales policy, returns policy, rebate policy, minimum advertised price policy.

10. An apparatus for determining an economic impact of business policies, comprising:
a computer system;
a business process definition module executable in the computer system for providing player definitions defining a plurality of players and an associated set of rules defining a decision space, a decision-making process tree, an information set, an outcome function, and a payoff function for each player;
a script translator module executable in the computer system for translating the player definitions into codified scripts, wherein the codified scripts define at least one simulation stage; and
a simulation module executable in the computer system for executing the codified scripts, wherein a result of the outcome and payoff functions at the end of execution of the at least one simulation stage determines the economic impact of the business policies.

11. The apparatus of claim 10 wherein the players comprise automated players.

12. The apparatus of claim 10 further comprising:
a calibration module executable in the computer system for providing calibration data for the defined players based on historical information, wherein the codified scripts are generated in accordance with the player definitions and the calibration data.

13. The apparatus of claim 10 further comprising:
a scenario database providing a plurality of scenarios defining variations on the set of rules associated with one or more players, wherein the script translator module generates scripts corresponding to the player definition variations.

14. The apparatus of claim 10 wherein the scripts are compiled on the fly during execution.

15. The apparatus of claim 10 wherein the scripts are compiled in their entirety before execution.

16. The apparatus of claim 10 wherein the set of rules associated with at least one player defines at least one business policy from the group comprising: advertising policy, sales policy, returns policy, rebate policy, and minimum advertised price policy.

17. A method of predicting a behavioral outcome resulting from a business rule, comprising:
a) defining at least one player, business rules, and an environment that defines actions that the player can take in accordance with the business rules;
b) translating, by a computer system, the definitions into a codified script; and
c) determining, by the computer system, a behavioral outcome resulting from player-selected actions during execution of the codified script.

18. The method of claim 17 wherein the behavioral outcome includes an economic state of each player.

19. The method of claim 17 further comprising:
d) executing variations of the codified script.

20. The method of claim 17, further comprising:
receiving historical data and producing calibration data based on the historical data,
wherein the codified script is translated from the definitions and the calibration data.

21. The apparatus of claim 10, wherein in response to modification of the set of rules for one or more players, the script translator re-translates the player definitions into modified scripts, and the simulation module is for executing the modified scripts.

22. The method of claim 17, further comprising:
modifying the definitions;
translating the modified definitions into a modified script; and
determining another behavioral outcome resulting from player-selected actions during execution of the modified script.

* * * * *